United States Patent [19]

Aguettant

[11] 4,200,209
[45] Apr. 29, 1980

[54] DEVICE FOR STOPPERING AND CONNECTING A CONTAINER CONTAINING A STERILE LIQUID

[75] Inventor: Georges Aguettant, Lyons, France

[73] Assignee: Laboratoire Aguettant, Lyon, France

[21] Appl. No.: 945,909

[22] Filed: Sep. 26, 1978

[51] Int. Cl.² .............................................. B65D 47/36
[52] U.S. Cl. ........................................ 222/541; 222/81
[58] Field of Search ............................ 222/80, 81, 541

[56] References Cited

U.S. PATENT DOCUMENTS

| 2,646,906 | 7/1953 | Jones et al. | 222/541 X |
| 2,894,510 | 7/1959 | Bellamy | 222/541 X |

FOREIGN PATENT DOCUMENTS 6405960  11/1964  Netherlands .............................. 222/541

*Primary Examiner*—Joseph J. Rolla
*Attorney, Agent, or Firm*—Browdy and Neimark

[57] ABSTRACT

A device for stoppering and connecting a container containing a sterile liquid comprises a pair of hollow cup-like elements aligned coaxially and sealed together along their peripheries in a fluid-tight manner; a disk formed of a fluid-tight, pierceable elastomeric material located between the two hollow cup-like elements, the disk serving to seal the interior of the upstream cup-like element from becoming contaminated while permitting successive passages of materials therethrough, the upstream cup-like element having a hollow extension for connection to the container or to a tube coming from the container; and the downstream cup-like element having a closed extension with a weakened separation line between the extension and the downstream cup-like element whereby the extension may be broken under stress from the downstream cup-like element to provide access to the elastomeric disk.

8 Claims, 4 Drawing Figures

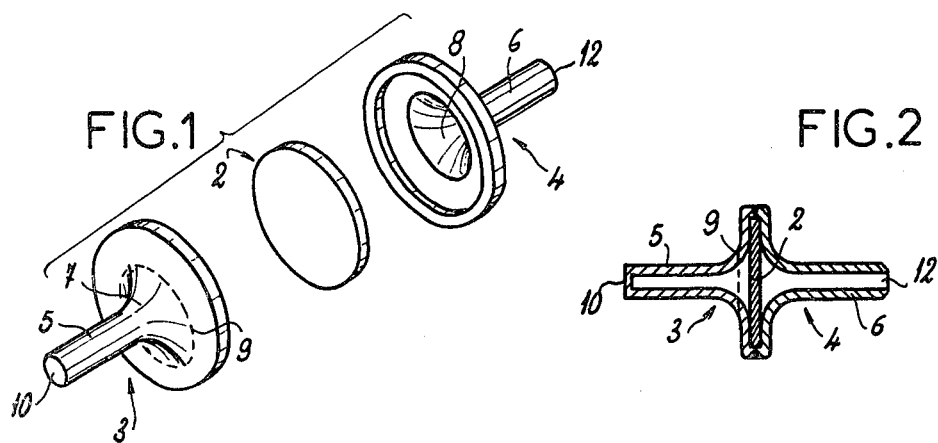
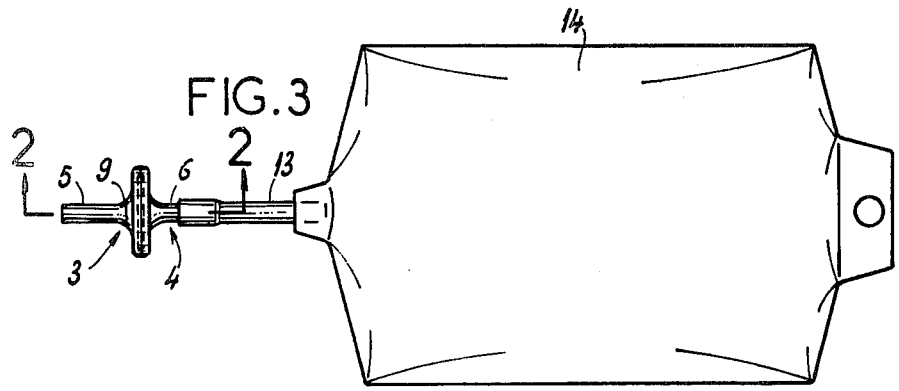
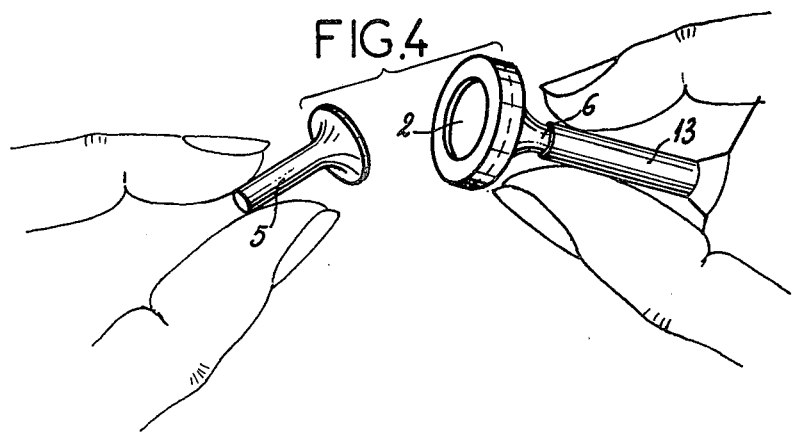

DEVICE FOR STOPPERING AND CONNECTING A CONTAINER CONTAINING A STERILE LIQUID

FIELD OF INVENTION

The present invention has for its object a device for stoppering and connecting a container containing a sterile liquid.

BACKGROUND OF INVENTION

Perfusion sera, used in the medical field, are often packaged in a sterile manner in containers. These containers can be glass bottles, semirigid bottles of a synthetic material, or flexible bags.

Extraction of the liquid contained in the container and possible additions of medicines are performed in different ways depending on the type of container in question.

For bottles of glass or semirigid material, access to the liquid is achieved by piercing a molded rubber stopper sealing these containers. Generally the stopper is covered with a metal cap whose central part can be removed. Since this cap does not cover the stopper in a fluid tight manner, it is necessary to asepticize the stopper surface before piercing it with a syringe needle containing an additive or with a trocar connected to a perfusion tube, or again before the first of these two operations when they are performed successively with a short time gap.

The drawback of this solution is that it is costly, because of the structure of the elements used, and that it requires an asepticizing operation calling for care and attention, causing a loss of time and requiring a suitable sanitizing means.

Flexible bags are generally equipped with a tube at whose end the stoppering and connecting take place.

There are now two main solutions for stoppering and connecting flexible bags.

According to the first solution, the perfusion tube exhibits a conically shaped end, called Luer conicity, fitting over a female cone of the tip stoppering the bag. After connection, flow of the liquid is achieved by breaking this stopper.

The main drawback of this system lies in the non-interchangeability of the bag with a bottle, because extraction of the liquid from a bottle requires, as indicated above, the use of a perfusion tube ending in a trocar. But in the case of the flexible bag, the perfusion tube in place ends in a Luer conical tip. However, it would be advantageous to be able to perform, after perfusion with a solution in the bag, other perfusions with products contained in bottles, because a certain number of products cannot be stored in a polyvinyl chloride bag. This cannot easily be done because the tips of the bags and bottles are not compatible.

Further, when a perfusion has been installed on a patient, the medical personnel want to keep the tube and needle mounted in the vein as long as possible, for the obvious comfort of the patient. This is why bags equipped with a Luer conical tip are hardly ever used in perfusion.

Moreover, this arrangement, for the same reasons, has the drawback of not facilitating the introduction of additional products.

Another solution consists in equipping the end of the tube, connected to the bag, with a stopper-holding tip which is a piece having the same inside dimensions as the mouth of a small bottle, and with a stopper and cap identical with those described above in the case of rigid or semirigid containers. Use of this tip therefore comes exactly to the deficiencies of the use of a bottle as indicated above.

SUMMARY OF INVENTION

The present invention aims at remedying the drawbacks of known devices.

For this purpose, the device with which it is concerned comprises two cup-shaped elements between which is inserted, with fluid tightness, a disk made of a fluidtight, piercable material, the two cups being equipped coaxially, respectively, with an open extension allowing the connection to the container itself or to a tube coming out into it, and an extension closed at its free end and exhibiting between the free end and the disk a weak zone allowing it to be broken by stress.

This device is extremely simple in its makeup and practical in its use. The device is sterilized at the same time as the bag. Before use, to make an addition of a product, or extraction of the liquid contained in the bag, or these two operations successively, all that is required is to take the extension corresponding to the free end of the device between two fingers and break it at the site of its zone of least resistance, to have access to the disk. The disk makes it possible to introduce a needle or trocar.

Advantageously, the two cups and their extensions are made of a synthetic material, while the inserted disk is made of an elastomer or the like.

This device is extremely inexpensive because of the simplicity of the pieces used, and particularly because the inserted disk, able to be cut from a simple sheet of elastomer, is much less burdensome than the molded stoppers now used.

In a preferred embodiment of the invention, this device comprises three pieces, namely, an inserted disk, and two cups each of which is provided with a tubular extension, the two cups being assembled by fusion on their periphery.

The fusion can be performed, for example, by ultrasound.

Advantageously, the zone of joining between each cup and its extension exhibits a general truncated cone shape whose large base is located on the side of a cup, and the weak zone provided between one of the bottles and its extension is located in the broad part of the zone of joining that is approximately like a truncated zone.

This latter characteristic assures a broad clearance of the inserted disk, facilitating its being pierced with a needle or trocar.

BRIEF DESCRIPTION OF DRAWING

In any event, the invention will be well understood from the following description with reference to the accompanying schematic drawing showing, by way of non-limiting example, an embodiment of this device:

FIG. 1 is an exploded view in perspective of the various component parts of this device;

FIG. 2 is a sectional view in mounted position, along line 2—2 of FIG. 3;

FIG. 3 is a side view of a bag equipped with this device, before use;

FIG. 4 is a perspective view of this device in its phase immediately preparing for use of the bag.

DETAILED DESCRIPTION OF EMBODIMENT

The device shown in the drawing comprises a disk 2 of elastomer or the like, inserted with fluid tightness between two cup-shaped elements 3 and 4 of synthetic material. These two cups are assembled by ultrasonic fusion made at their facing peripheries. These two cups 3 and 4 are coaxially equipped, respectively, with an extension 5 and an extension 6 made of the same material and provided integrally therewith.

The junction zones, respectively, 7 between cup 3 and its extension 5, and 8 between cup 4 and its extension 6 generally have the shape of a truncated cone, the large bases being located on the cup side.

Junction zone 7 is connected to the cup 3 by a part 9 with least resistance, allowing a break to be made between extension 5 and cup 3 by a slight stress applied along the weakened line 9. Extension 5 has a closed free end 10, while extension 6 has an open end 12. Extension 6 of the cup 4 is engaged in a tube 13 coming out of bag 14 which contains a sterile liquid.

From a practical viewpoint, the unit being in the state shown in FIG. 3, and the device having been sterilized at the same time as bag 14, all the operator has to do, before use, is to take extension 5 of cup 3 between two fingers and exert a slight stress on it to cause, as shown in FIG. 4, its breakoff from cup 3 at the site of least resistance, allowing a direct access to disk 2, for piercing the latter with a syringe or trocar.

As can be seen from the above, the invention makes an improvement in the existing technique by providing a device having a simple structure, low in cost, and easy to use. Further, the fluid tightness remains absolute after breaking of the extension and during trocaring. It should be noted that the surface of the intermediate disk is perfectly sterile, without cleaning.

It goes without saying that the invention is not limited to the single embodiment of the device described above by way of example; on the contrary, it takes in all variant embodiments. Particularly, the arrangement of the cup-like elements could be different, or they could be made from a number of elements without thereby going outside the scope of the invention.

I claim:

1. A device for stoppering and connecting a container containing a sterile liquid, comprising
   two hollow cup-like elements aligned coaxially and sealed together along their peripheries in a fluid-tight manner, one said cup-like element being an upstream element located adjacent the container, and the other being a downstream hollow cup-like element;
   sanitary sealing means to protect and seal the interior of said upstream cup-like element from becoming contaminated while permitting successive passages of materials therethrough, said sanitary sealing means comprising a disk of a supple, fluid-tight, piercable material located between said hollow cup-like elements;
   said upstream cup-like element having a hollow extension for connection to the container or to a tube coming out of the container; and
   said downstream cup-like element having a closed extension with a weakened separation line between said extension and said downstream cup-like element whereby the extension may be broken under stress from said downstream cup-like element thereby providing access to said disk.

2. A device in accordance with claim 1, wherein said extension of said downstream cup-like element attached thereto by a weakened line, constitutes a hollow tube extension sealed at its free end.

3. A device in accordance with claim 1 formed of plastic.

4. A device in accordance with claim 1, wherein said hollow cup-like elements and their extensions are formed of a synthetic material, and said disk is formed of an elastomer.

5. A device in accordance with claim 4 consisting of said disk, said upstream cup-like element having its extension integral therewith and said downstream cup-like element having its extension integral therewith, both said extensions being tubular, and wherein said two cup-like elements are assembled together by fusion along their peripheries.

6. A device in accordance with any of claims 1, 4 or 5, wherein each cup-like element and its extension exhibit the general shape of a truncated cone, the large base of which is located along their facing edges, and wherein the weak zone provided between said downstream cup-like element and its extension is located in the broad part of the junction zone shaped like a truncated cone.

7. In a sealed container having a device for stoppering and connecting said container so as to dispense a sterile liquid from said container or to accept a liquid into said sterile container, the improvement wherein said stoppering and connecting device comprises
   an elongated hollow element having an upstream end and a downstream end, its downstream end being sealed and its upstream end being connected to the container itself or to a tube coming out of said container;
   sanitary sealing means to protect and seal the interior of said upstream end of said elongated hollow element from becoming contaminated while permitting, successively, passage of sterile liquid therethrough into said container and then passage of sterile liquid from said container, said sanitary sealing means comprising said elongated hollow element having therein and extending in a fluid-tight manner thereacross within the interior thereof a disk made of a supple, fluid-tight, piercable material;
   and means to facilitate breaking off the downstream end of said hollow elongated element to expose said disk made of fluid-tight, piercable material.

8. A device in accordance with claim 7, wherein said hollow elongated element has a relatively small diameter at both of its ends and a relatively large diameter at the middle thereof, said disk extending thereacross at said middle portion with the larger diameter.

* * * * *